United States Patent [19]
Barlage

[11] Patent Number: 6,115,265
[45] Date of Patent: Sep. 5, 2000

[54] CONSTANT OUTPUT CURRENT LOAD DRIVER

[75] Inventor: Francis Michael Barlage, Oro Valley, Ariz.

[73] Assignee: AlliedSignal Inc., Morristown, N.J.

[21] Appl. No.: 08/200,123

[22] Filed: Feb. 22, 1994

[51] Int. Cl.[7] .................................................. H02M 3/335
[52] U.S. Cl. ............................................... 363/21; 363/97
[58] Field of Search .................................. 363/20, 21, 97, 363/131

[56] References Cited

U.S. PATENT DOCUMENTS 5,297,014  3/1994  Saito et al. ................................. 363/21

Primary Examiner—Jessica Han
Attorney, Agent, or Firm—William J. Zak, Jr., Esq.

[57] ABSTRACT

A transformer-coupled load driver (10) is adapted to provide a constant level of output current under condititons of variable input voltage and/or variable load resistance. The load driver (10) is provided with a current sensing resistor (30) which is included in an output branch (14) of the transformer (12). A pulse-width modulator (18) is used in conjunction with a voltage divider network (20) to sense current flow through the resisitor (30) and to control the current output of the branch (14) via modulation of a control signal delivered to the gate of a transistor (16).

9 Claims, 1 Drawing Sheet

CONSTANT OUTPUT CURRENT LOAD DRIVER

TECHNICAL FIELD

The present invention relates generally to a load driver circuit (hereinafter, 'load driver'), and more specifically to a load driver which is designed to achieve high efficiency and/or fault tolerance in a power supply which operates at a constant level of output current.

BACKGROUND OF THE INVENTION

In the design of solenoids and other electrical load devices, the designer must sometimes account for the variation of resistance with temperature in determining the number of amp-turns required for the device to operate as intended. The problem is further complicated in cases where the available voltage supply varies over some predetermined range in response to changing conditions. Thus, the designer may have to consider both variation in resistance and variation in supplied voltage in determining the required amp-turns for the device.

For example, in an application where a bus voltage varies from 14 to 32 volts and coil resistance varies from 20 to 60 ohms, the designer must ensure that the device can draw from about 0.25 to 1.5 amps. However, the device needs only the minimum level of current (0.25 amps) to ensure that amp-turn requirements are met. So long as that minimum level of current is provided, the device will perform as needed under all operating conditions within the prescribed ranges of voltage and resistance. By driving the device with only the minimum level of required current, the user of the device consumes less power than he would if it were driven in the more conventional manner of allowing output current to vary in accord with power requirements.

An object of the present invention is to provide a load driver which operates at a constant level of output current.

A further object of the invention is to provide such a load driver with fault tolerance, meaning that a failure in the load device will result in zero output voltage.

Other objects and advantages of the invention may become apparent from the following description, which includes the appended claims and accompanying drawing.

SUMMARY OF THE INVENTION

The invention is a load driver which is adapted to produce a variable voltage output at substantially constant current. The load driver comprises a transformer including primary and secondary windings, the secondary winding including first and second ends; an output branch for connection to a reactive and inductive load, the branch being connected to the secondary winding and including a resistor aside from the load; a transistor connected to the primary winding so as to be operable to modulate current flow therethrough, the transistor including a control input; and a pulse-width modulator connected to the resistor so as to be operable to sense current flow therethrough, and connected to the control input of the transistor so as to be operable to modulate current flow therethrough in response to the current flow through the resistor.

In a preferred embodiment of the invention, the current sensing resistor is connected between the second end of the secondary winding and ground. This makes it unnecessary for the user to provide an additional wire connected between the resistor and the load.

By use of a load driver which operates at a constant level of output current, the invention provides the user with a means for operating a load device with minimal power consumption. By designing the load driver such that it is transformer coupled to the load, the invention provides a high degree of fault tolerance.

BRIEF DESCRIPTION OF THE DRAWING

The FIGURE is a circuit diagram showing a constant output current load driver according to the present invention.

DESCRIPTION OF THE PREFERRED EMBODIMENT

Figure 1:
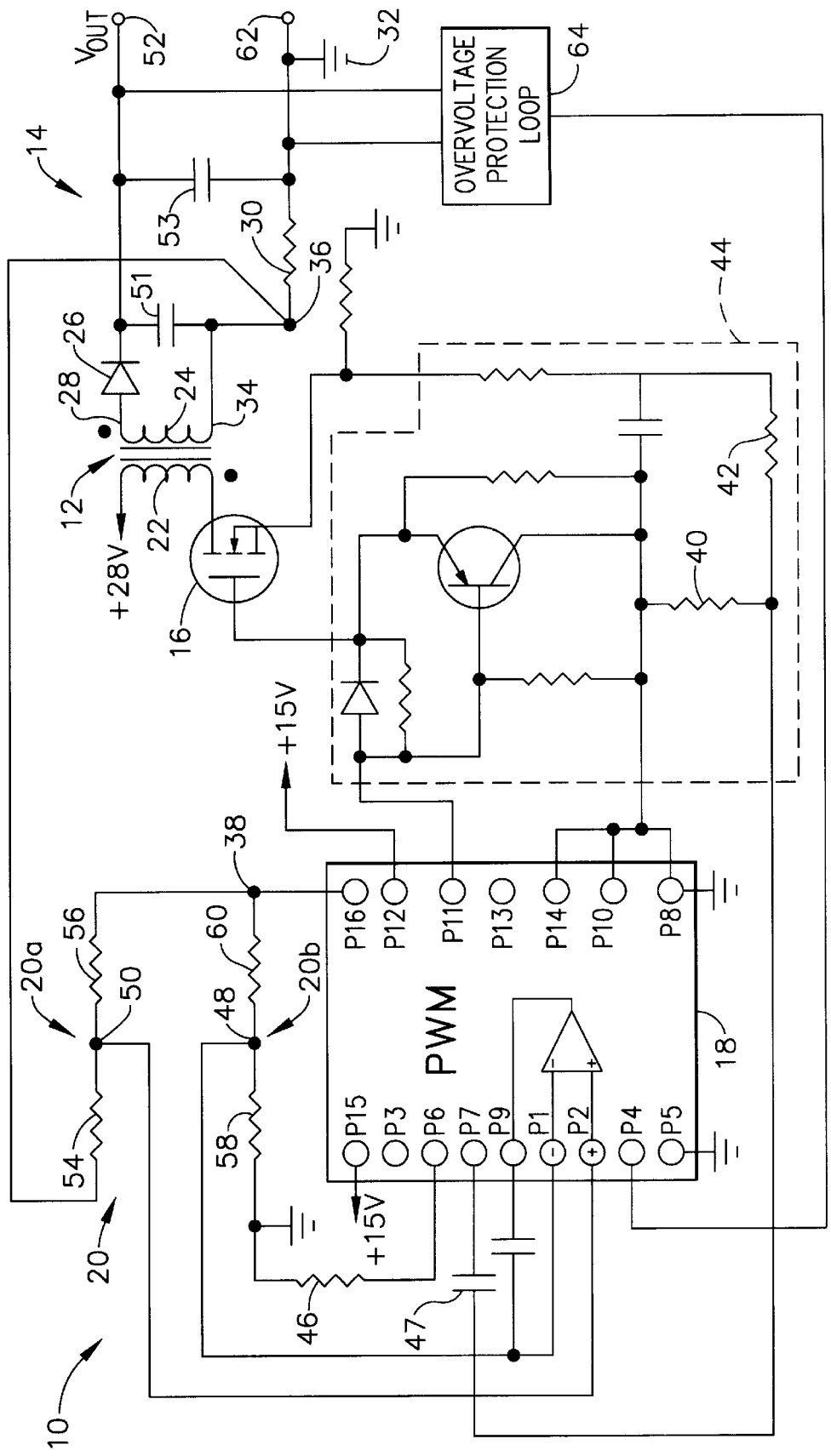

The drawing illustrates a transformer-coupled load driver 10 comprised of a transformer 12, an output branch 14, a transistor 16, a pulse-width modulator ("PWM") 18, and a voltage divider network 20. The transistor 16 is connected to the primary winding 22 of the transformer 12 as shown, and the latter includes a secondary winding 24 to which the output branch 14 is connected.

The output branch 14 includes a diode 26 connected to a first end 28 of the secondary winding 24, and, in the illustrated embodiment of the invention, a current-sense resistor 30 connected between ground 32 and the second end 34 of the secondary winding. Connected to the output branch 14 at a junction 36 between the resistor 30 and the secondary winding 24 is a first voltage divider 20a. The voltage divider 20a is connected in parallel with a second voltage divider 20b at a junction 38.

The PWM 18 may be any suitable modulator of either current-mode or voltage-mode topology. Schematically illustrated in the drawing is a Unitrode, Inc. UC1524A (voltage-mode) adapted to operate in current-mode topology by the provision of resistors 40, 42 in an otherwise conventional transformer driver 44 (enclosed by dashed line), connected to the PWM as shown. The PWM 18 includes sixteen pins P1–P16. A fifteen-volt power source is connected to P12 and P15. An internal voltage regulator provides a five-volt output at P16, which is connected to junction 38. P7 is an input to an internal oscillator, and P9 is an inverting input to an internal comparator. P6 is a constant-voltage output which, with external resistor 46 and capacitor 47, sets the oscillation frequency. P1 and P2 are inverting and noninverting inputs, respectively, to an internal integrator, the output of which is communicated to P9. P1 is connected to the second voltage divider 20b and receives a constant 1-volt input from the indicated junction 48. P2 is connected to the first voltage divider 20a and receives an input varying from 1.0 to 1.6 volts from the indicated junction 50. It should be noted that these inputs to the internal integrator are reversed from normal practice because of the negative-going voltage at junction 36. It is possible to practice the invention by connecting the current-sense resistor 30 to the high side of the output branch 14 between the diode 26 and the output terminal 52. In that case, the connections to P1 and P2 from the junctions 48, 50 would be opposite that illustrated in the drawing, and the values for resistors 54, 56, 58, 60 would be altered as needed to come within the common-mode range of the integrator. If the current-sense resistor 30 is connected to the low side of the output branch 14 between ground 32 and the opposite output terminal 62, the connections to P1 and P2 from the junctions 48, 50 would be opposite that illustrated, with no material change in the resistors 54, 56, 58, 60.

A voltage divider and filter capacitor (not shown) implement a maximum voltage protection loop 64 which is connected to P4. This prevents damage to components if the load is disconnected from the supply.

In operation of the load driver 10, a fifteen-volt power source is applied to P12 and P15, causing the reference voltage at P16 to go immediately to five volts. This causes node 48 and P1 to go to one volt, while node 50 and P2 go to 1.6 volts. Because P2 is the noninverting input to the internal integrator and is more positive than P1, the output of the integrator immediately slews to its most positive value. This causes the PWM 18 to generate its maximum output pulse at P11. That signal, via the output branch 14, the transformer driver 44, and the 28-volt power to the primary winding 12, is transformed into a stream of maximum output energy pulses as current through the winding is modulated by the FET 16. The output energy pulses are filtered by capacitors 51 and 53, and cause the output voltage Vout to begin to increase.

As output voltage Vout increases, current starts to flow from the driver 10 to the load, through the load, and back to the driver at node 62. It should be noted that it is not necessary for the return path to be a single wire dedicated to only one output, since many driver returns may be combined on one return path. The returning current flows from node 62 through the current sensing resistor 30 to node 36, which completes the loop.

As current flows through the resistor 30, node 36 is driven negative which, via voltage divider 20*a*, causes node 50 to start going in the negative direction (i.e., decreasing from 1.6 volts). When current becomes sufficiently great, node 50 will go slightly below node 48, which means that the negative input to the integrator at P1 is then more positive than the positive input at P2. Accordingly, the integrator starts to slew away from its maximum value, which in turn starts to decrease the pulse width at P1. This results in less energy output, causing Vout to start to decrease. The decrease in Vout causes the output current to start to decrease, thus causing node 36 to start to go in the positive direction (less negative). This causes node 50 to go more positive and to eventually become greater than the voltage at node 48, at which point the integrator once again starts to slew in the positive direction.

The overall effect is a control loop which maintains a substantially constant output current as load resistance and/or input voltage to the transformer 12 vary. Moreover, since the load driver 10 is transformer coupled, it provides greater fault tolerance than conventional load driver designs.

The foregoing description of the preferred embodiment is not intended to restrict the scope of the invention more than is indicated by the teaching contained herein. It should be understood, for example, that loop compensation schemes will be somewhat different for different types of pulse-width modulators and modes of operation.

What is claimed is:

1. A load driver adapted to produce a variable voltage output at substantially constant current, comprising in combination:

a transformer including primary and secondary windings, the secondary winding including first and second ends;

an output branch to be connected to a reactive and inductive load, and connected to the secondary winding; the output branch including a resistor aside from the load;

a transistor connected to the primary winding so as to be operable to modulate current flow therethrough, the transistor including a control input;

a pulse-width modulator connected to the resistor so as to be operable to sense current flow therethrough, and connected to the control input of the transistor so as to be operable to modulate current flow therethrough in response to the current flow through the resistor, to produce a substantially constant current, variable voltage output.

2. A load driver as recited in claim 1 wherein the the pulse-width modulator comprises an integrator having inverting and noninverting input terminals.

3. A load driver as recited in claim 2 further comprising first and second voltage dividers connected in parallel to the input terminals, the voltage dividers being operable in combination with a reference voltage source to provide voltage inputs to the terminals at levels suitable for operation of the modulator.

4. A load driver as recited in claim 3 wherein the first voltage divider is connected between the modulator and the output branch.

5. A load driver as recited in claim 4 wherein the output branch further includes a diode; the first end of the secondary winding being connected to the diode, and the resistor being connected between the second end and ground.

6. A load driver as recited in claim 1 wherein the output branch further includes a diode; the first end of the secondary winding being connected to the diode, and the resistor being connected between the second end and ground.

7. A load driver as recited in claim 6 further comprising a voltage divider network connected to the modulator, and connected to the output branch between the resistor and the second end of the secondary winding.

8. A load driver adapted to produce a variable voltage output at substantially constant current, comprising in combination:

a transformer including primary and secondary windings, the secondary winding including first and second ends;

an output branch connected to the secondary winding and including a resistor;

a transistor connected to the primary winding, the transistor including a control input; and a pulse-width modulator connected to the resistor and the transistor so as to be operable to sense current flow through the resistor and to modulate current flow through the transistor in response to current flow through the resistor, to produce a substantially constant current, variable voltage output.

9. A load driver as recited in claim 8 wherein the modulator includes an integrator having an inverting terminal, and a voltage divider connected between the inverting terminal and the resistor.

\* \* \* \* \*